United States Patent [19]
Kosugi

[11] Patent Number: 5,548,502
[45] Date of Patent: Aug. 20, 1996

[54] PUSH-PULL, RESONANT TYPE SWITCHING POWER SUPPLY CIRCUIT

[75] Inventor: Mitsuo Kosugi, Hamamatsu, Japan

[73] Assignee: Hamamatsu Photonics K.K., Shizuoka-ken, Japan

[21] Appl. No.: 297,044

[22] Filed: Aug. 29, 1994

[30] Foreign Application Priority Data

Aug. 27, 1993 [JP] Japan .................................. 5-213069

[51] Int. Cl.$^6$ .......................... H02M 3/335; H02M 7/538
[52] U.S. Cl. ................................ 363/22; 363/133
[58] Field of Search .................................. 363/15, 22, 23, 363/24, 25, 133, 134; 323/223, 247, 251, 282, 285

[56] References Cited

U.S. PATENT DOCUMENTS

| | | | |
|---|---|---|---|
| 4,422,050 | 12/1983 | Suzuki | 330/263 |
| 4,560,918 | 12/1985 | Callen | 323/273 |
| 4,734,828 | 3/1988 | Vargo | 363/22 |
| 4,811,187 | 3/1989 | Nakajima et al. | 363/25 |
| 5,327,337 | 7/1994 | Cripe | 363/134 |
| 5,345,374 | 9/1994 | Sato et al. | 363/24 |

FOREIGN PATENT DOCUMENTS

| | | | |
|---|---|---|---|
| 0471421 | 2/1992 | European Pat. Off. | H02M 3/28 |
| 3008887 | 9/1981 | Germany | H02M 3/335 |
| 4023139 | 1/1992 | Germany | H02M 3/28 |

OTHER PUBLICATIONS

Patent Abstracts of Japan, unexamined applications, E field, vol. 17 No. 319, Jun. 17, 1993 p. 66 E 1383; & JP-A-05 30 742 (NEC Corporation).

*Primary Examiner*—Matthew V. Nguyen
*Attorney, Agent, or Firm*—Sughrue, Mion, Zinn, Macpeak & Seas

[57] ABSTRACT

To provide a resonant switching power supply switch with a simple structure and little noise, a push-pull resonant switching power supply circuit includes a transformer 104, a capacitor 105, two transistors 106a and 106b (bipolar transistors or field-effect transistors), and a bias circuit 201. The transformer 104 has a rectification circuit 340 connected to its secondary winding. The capacitor 105 forms a parallel resonant circuit in combination with the transformer 104. The transistors 106a and 106b are push-pull connected to the primary winding of the transformer 104 and the bases of which are connected to a feedback winding 104 of transformer. The bias circuit 201 applies a variable bias voltage to the base of the transistors.

16 Claims, 14 Drawing Sheets

PUSH-PULL, RESONANT TYPE SWITCHING POWER SUPPLY CIRCUIT

BACKGROUND OF THE INVENTION

1. Field of the Invention

The present invention relates to a push-pull, resonant type switching power supply circuit.

2. Description of the Prior Art

An example of a conventional regulated power supply circuit is the dropper type power supply circuit shown in FIG. 1. The circuit is structured to obtain a high voltage. An oscillator 320 converts d.c. input into an a.c. output. A transformer 330 boosts the a.c. voltage and then a rectifying circuit 340 converts the a.c. voltage into a d.c. voltage and outputs the latter. A constant-voltage control circuit 350 is connected between the output of the rectifying circuit 340 and a d.c. limiting element 310, wherein the d.c. voltage output from the rectifying circuit 340 is compared with a reference voltage supplied from a reference voltage source 360. A current flowing from the d.c. limiting element 310 to the oscillator 320 is controlled according to the difference between the output of the rectifying circuit 340 and the reference voltage. In this manner, an output voltage dependent on the reference voltage can be obtained.

FIG. 2 shows an arrangement of another conventional switching power supply circuit according to pulse-width modulation (PWM) control. The inputted voltage is converted into an a.c. voltage by repeatedly turning the switching element 410 on and off. The a.c. voltage is boosted by the main transformer. Afterward, the rectifying circuit 340 converts the a.c. voltage into a d.c. voltage and outputs the latter. The constant-voltage control circuit 350 compares the output d.c. voltage with the reference voltage supplied from a reference voltage source 360. The PWM control 420, powered by an auxiliary power supply 430, changes the switching pulse width in the switching element 410 in accordance with the difference between the d.c. voltage from the rectifying circuit 340 and the reference voltage. In this way, the a.c. voltage applied to a main transformer is controlled so that an output voltage dependent on the reference voltage is obtained.

FIG. 3 shows a specific example of a circuit structure. In this example, a special-purpose IC chip is used on the control and drive circuits 420, 350, and 360, and a switching section 410 is constructed with a half bridge circuit. Further, the power supply on the input side converts an a.c. 100 V into a d.c. voltage by a rectifying and smoothing circuit 400. Another example is described in reference 1: Japanese Laid-Open Patent Publication No. SHO-64-5353, which describes a circuit for suppressing surge currents that occur during light loads and for increasing conversion efficiency.

Recently, restrictions on unnecessary radiation have become more strict. To deal with these restrictions, resonant type switching power supply circuits have been proposed. The main categories of this type of circuit can be classified as follows: current resonant vs. voltage resonant types (series-connection resonance vs. parallel-connection resonance types), self-excited types vs. separate-excited types, single types vs. push-pull types, as described in the second reference: Transistor Technology Special No. 28. Although there are few examples of these circuits because it has only been researched in recent years, there are current resonant separately-exited push-pull types as per reference 2; current resonant separately-excited push-pull type described in reference 3: Japanese Laid-Open Patent Publication No. HEI-5-30742; and a modification of a blocking oscillator (modification of an RCC type) described in reference 4: Japanese Laid-Open Patent Publication No. HEI-1-194867.

In the dropper circuit of FIG. 1, the power represented by the product of voltage across the d.c. limiting element 310 and the current flowing therein is consumed in the d.c. limiting element 310 and a great deal of heat is generated therein. Further, the thus generated heat needs to be sufficiently released. It is difficult to produce a compact device that allows sufficient release of heat.

PWM control overcomes the above-described disadvantage. However, PWM control has the disadvantages in that the number of circuit components, costs, and also the amount of high-frequency noise increases.

Resonant switching power supply circuits overcome the disadvantage of the higher-harmonic noise in resonant circuits. However, the circuit structure is still complicated. For example, a great many circuit elements are required to control and drive the switching elements in a current resonant separately-excited single type as per reference 2. On top of this, a disadvantage as shared with forward type PWM control type remains unsolved such that large inductance L is required to obtain a large Q value representing sharpness of resonance when power increases. Although push-pull types, the circuits described in reference 3 have the same disadvantages because they are also current resonant separately-exited types. In the modifications of blocking oscillator types described in reference 4, energy outputted to the secondary winding is the same as energy stored in the inductance L in the same manner as in an RCC type. Therefore, when power increases, a large size transformer is necessary and a large space to hold the transformer is required. Also, because the transformer is caused to be saturated and so oscillates, an exciting current suitable for the transformer is required. Induction noise generated by leaks of magnetic flux become a problem as does efficiency.

SUMMARY OF THE INVENTION

It is an object of the present invention to provide a resonant switching power supply circuit with low noise and a simple construction.

In order to overcome the above-described problems, according to the present invention, there is provided a switching power supply circuit which comprises a transformer including a primary winding, a feedback winding, and a secondary winding. The primary winding and the feedback winding are located at a primary side of the transformer, and the secondary winding is located at a secondary side of the transformer. A capacitor is connected in parallel to the primary winding to form a resonance circuit in combination with the primary winding. The resonance circuit resonates at a frequency determined by the capacitance of the capacitor and the inductance of the primary winding. There is provided a rectifying circuit which is connected to the secondary winding, rectifies a voltage developed across the secondary winding, and produces a rectified voltage. A transistor pair is connected across the primary winding in push-pull configuration. The transistor pair includes a first transistor having a control electrode (base) connected to the first terminal of the feedback winding, and a second transistor having a control electrode (base) connected to the second terminal of the feedback winding. A bias circuit is connected to the control electrodes of the first and second transistors and applies a bias voltage thereto. The bias circuit includes means for varying the bias voltage.

A voltage division means is further connected to the output of the rectifying circuit to produce a divided voltage of the rectified voltage. The bias voltage varying means includes means for generating a reference voltage and a differential amplifier having a non-inverting input terminal applied with the reference voltage and an inverting input terminal applied with the divided voltage of the rectified voltage. The differential amplifier produces an amplified differential output of the reference voltage and the divided voltage of the rectified voltage.

It is preferable that the reference voltage generating means comprises means for varying the reference voltage.

In the switching power supply circuit according to the present invention, first and second transistors are connected to the primary winding of a transformer to perform a push-pull operation. A positive feedback circuit is formed by the connection of the feedback winding to the bases of the first and second transistors so that a signal from the feedback winding is fed back to the bases of these transistors. The resonance circuit oscillates at a frequency determined by the primary winding and the capacitor connected in parallel thereto. That is, a self-excited push-pull switching power supply circuit is provided by such an arrangement. The d.c. level of the feedback signal sent from the feedback winding to the bases of the transistors is changed by changing of the bias voltage. Because the peak value of the feedback signal changes caused by the change of the bias voltage, the level of the voltage induced in the secondary winding is controlled. In this manner, output from the secondary winding can be obtained according to the bias voltage.

The bias voltage, controlled by comparing the rectified output of the secondary winding of the transformer with a reference voltage, is applied to the bases of the transistors. That is, a feedback control system is formed wherein the target value is the reference voltage and the control parameter is the rectified output obtained from the secondary winding of the transformer. The rectified output is controlled so as to be a fixed value dependent on the reference voltage.

With the use of a single winding for the feedback winding, the construction of the transformer per se can be simplified. In addition, because the bias voltage is applied to the base of the other transistor via the feedback winding, the first transistor is rendered ON at the start up of the circuit, whereby the start up of the circuit is ensured.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

Figure 4:
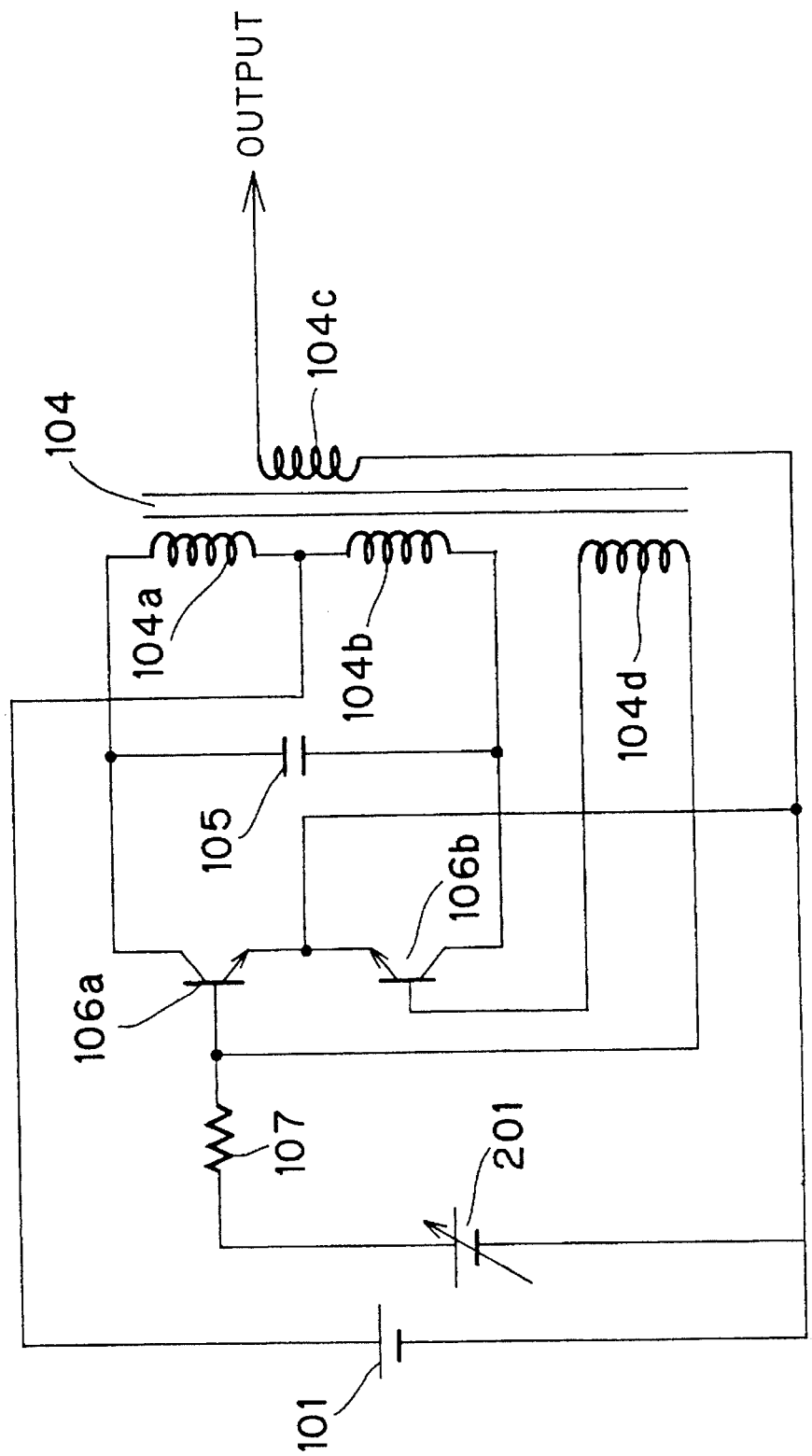
FIG. 4 is a structural diagram schematically showing a switching power supply circuit according to the present invention.

An embodiment of the present invention will be described with reference to the drawings. FIG. 4 is a conceptional diagram showing a construction of a switching power supply circuit according to the present invention wherein it is assumed that there is no load fluctuation. In this example, bipolar transistors are used as the switch elements.

A capacitor 105 is connected across a series connection of the primary windings 104a and 104b of a transformer 104, thereby forming an LC resonant circuit. The LC resonance circuit oscillates at a resonance frequency determined by the inductance of primary windings 104a and 104b and the capacitance of capacitor 105. Transistors 106a and 106b are connected in a push-pull configuration. The voltage from a power supply 101 is applied to the center tap of the primary windings 104a and 104b. On the other hand, the feedback winding 104d of the transformer 104 is a single winding. One terminal of the feedback winding 104d is connected to the base of the transistor 106a and the other terminal of the feedback winding 104 is connected to the base of the transistor 106b. With such connections of the transformer 104, the arrangement of the transformer 104 is simplified and the voltages applied to the bases of the transistors 106a and 106b are in opposite phase with each other. In this way, the voltage of a drive signal is fed back to the bases of the transistors 106a and 106b to cause the circuit to perform a self-excited resonance oscillation.

Bias voltage from a bias power supply 201 is applied to the base of the transistor 106a via a current limiting resistor 107. Also, bias voltage from the bias power supply 201 is applied to the base of the transistor 106b via the feedback winding 104d. When a bias voltage is applied at start up of the device, a bias current initially flows to the base of the transistor 106a and subsequently a bias current flows to the base of the transistor 106b. The delay of the bias current to the transistor 106b is caused by the feedback winding 104d. For this reason, the transistor 106a is rendered ON at the start up of the device, thereby ensuring the start of self-excited oscillation.

Further, the bias voltage applied to the transistors 106a and 106b from the bias power supply 201 is variable. By varying the bias voltage, the direct current level of the feedback signal from the feedback winding 104d to the base of the transistor 106b changes. Because the peak value of the base voltage (current) at the transistor 106b changes, the level of the voltage inducted at the secondary winding 104c is controlled. By rectifying the alternating voltage obtained from the secondary winding 104c of the transformer 104 using a well-known rectifying circuit (not shown) and converting the alternating voltage to a direct voltage, a direct voltage of a desired level can be obtained.

Figure 5:
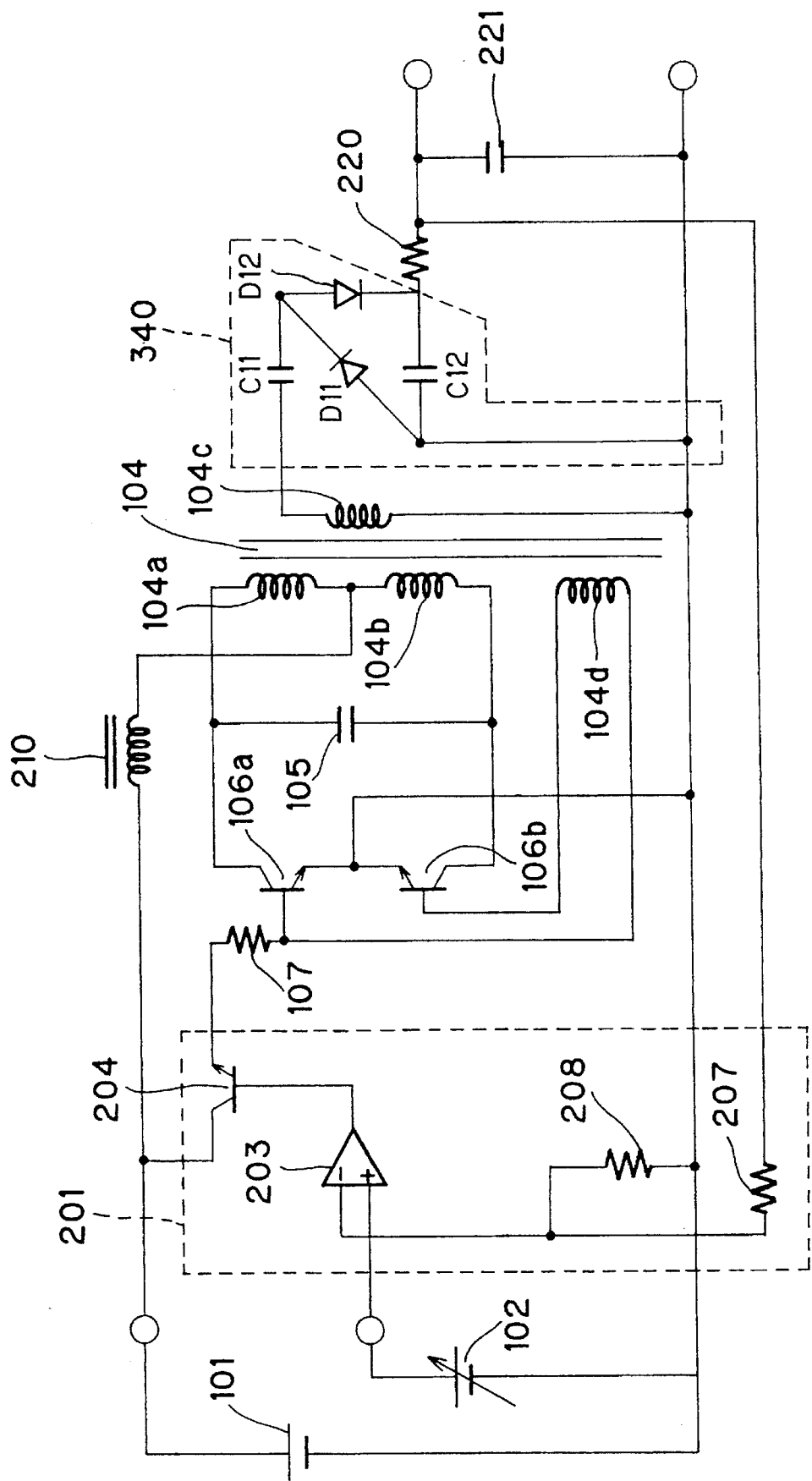
FIG. 5 is a diagram showing a specific circuit arrangement of an exemplary switching power supply circuit according to the present invention.
Figure 6:
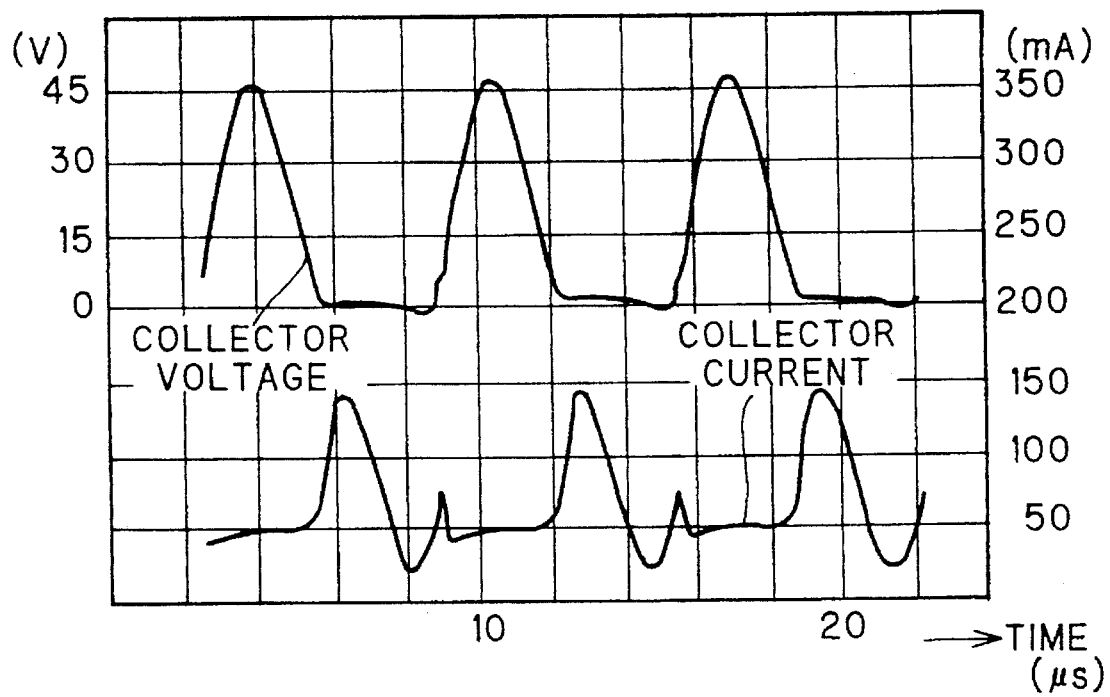
FIG. 6 is a diagram showing an example of actual waveforms of collector current (lower lever) and collector voltage (upper level) from a transistor 106a when reference voltage 102 is changed so that the d.c. output voltage $V_{OUT}$ is 1,500V, wherein the oscillating frequency is 153 KHz and a load of 30 MΩ is connected to the output of the circuit shown in FIG. 5.
Figure 7:
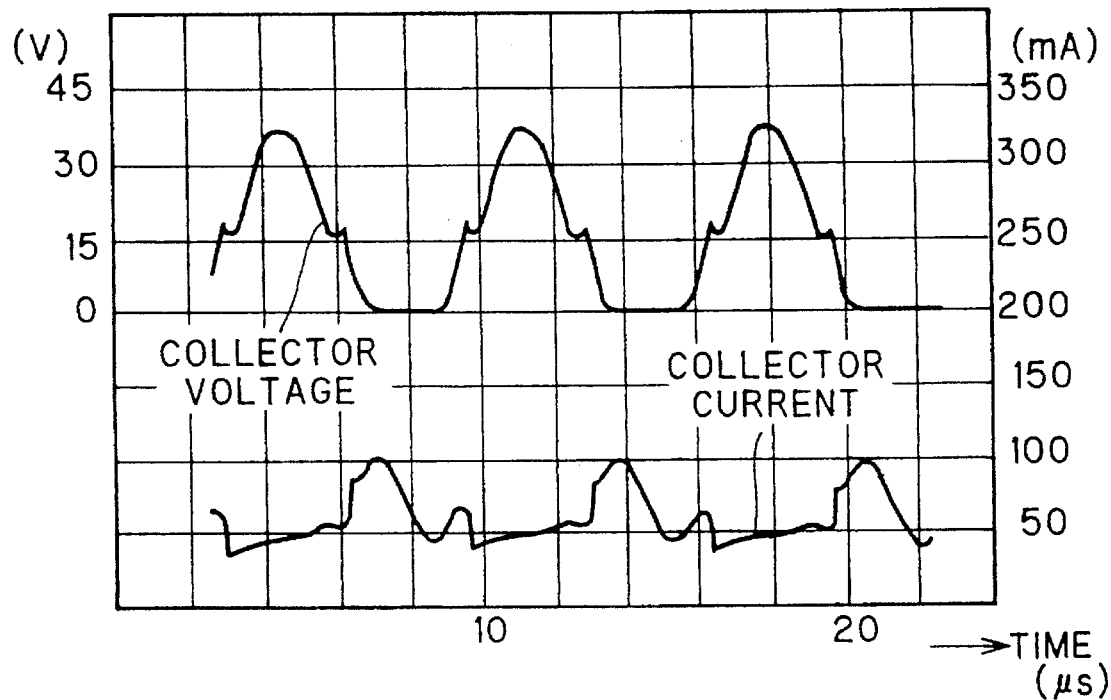
FIG. 7 is a diagram showing an example of actual waveforms of collector current (lower lever) and collector voltage (upper level) from a transistor 106a when reference voltage 102 is changed so that the d.c. output voltage $V_{OUT}$ is 1,200V, wherein the oscillating frequency is 153 KHz and a load of 30 MΩ is connected to the output of the circuit shown in FIG. 5.
Figure 8:
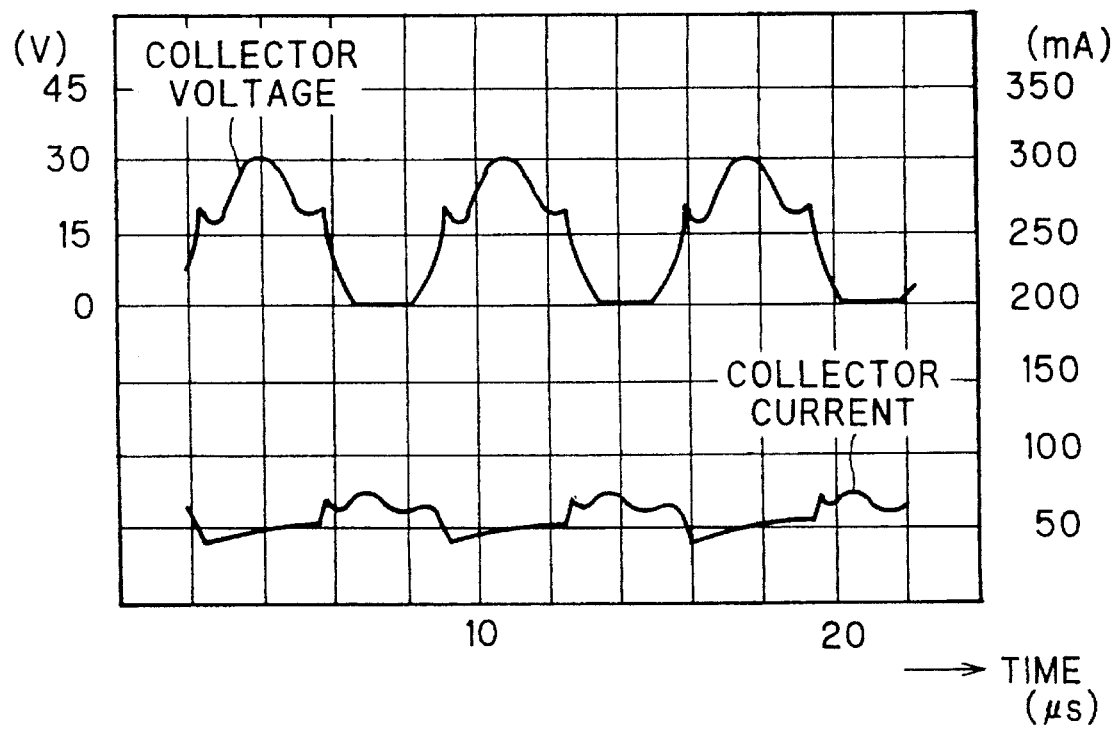
FIG. 8 is a diagram showing an example of actual waveforms of collector current (lower lever) and collector voltage (upper level) from a transistor 106a when reference voltage 102 is changed so that the d.c. output voltage $V_{OUT}$ is 1,000 V, wherein the oscillating frequency is 153 KHz and a load of 30 MΩ is connected to the output of the circuit shown in FIG. 5.

FIG. 5 shows a specific example of a circuit arrangement of a switching power supply circuit according to the present invention, wherein a fixed level of a rectifying output can be obtained regardless of the presence of a load fluctuation. Components indicated in FIG. 5 that are the same as those in FIG. 4 are indicated with the same reference numerals.

In the circuit of FIG. 5, a capacitor 105 is connected across the series connection of primary windings 104a and 104b of a transformer 104 to thereby form a resonance circuit similar to the circuit arrangement shown in FIG. 4. Transistors 106a and 106b are also connected in a push-pull configuration. A feedback winding 104d comprised of a single winding is connected at one terminal to the base of a transistor 106a and at the other terminal to the base of a transistor 106b, thereby forming a push-pull oscillation circuit of a self-excited voltage resonance type with a fixed oscillation frequency.

A winding 210 having an inductance greater than the inductance of primary windings 104a and 104b, is connected between the power supply 101 and the center tap of the primary windings 104a and 104b. With the provision of the winding 210, the current flowing in the primary winding of the transformer 104 is averaged so that noise is prevented from appearing at the input power supply 101.

A voltage, corresponding to the turns ratio of the secondary winding 104c to the primary winding 104a, 104b, is inducted to the secondary winding 104c. In order to attain a desired output voltage, the number of turns in the secondary winding is determined by the product of the number of turns in the primary winding and a ratio of the output voltage to the voltage of the input power supply 101.

In the present embodiment, a Cockcroft circuit 340 is employed as a circuit for rectifying alternating current from the secondary winding 104c so that direct current obtained is doubled. The Cockcroft circuit 340 is constructed from diodes D11 and D12, and capacitors C11 and C12. The output side of the rectification circuit 340 is connected to an RC filter made up of a capacitor 221 and a resistor 220, for decreasing ripple component.

The bias circuit 201 includes resistors 207 and 208, with which the output voltage from the rectifying circuit 340 is voltage divided. A difference between the voltage developed across the resistor 208 and the reference voltage 102 is used as a bias voltage. A constant voltage source can be used for generating the reference voltage. In such a case, it is desirable that the output voltage from the constant voltage source be adjustable. The adjustment can be achieved according to a well-known method. A differential amplifier 203 has an inverting input terminal applied with a voltage divided by the resistors 207 and 208 and a non-inverting input terminal applied with the reference voltage 102. The differential amplifier 203 amplifies the difference between the reference voltage 102 and the voltage divided by the resistors 207 and 208. The differential amplifier 203 can also be constructed according to a well-known method by, for example, using an operation amplifier or a circuit using two transistors. Such differential amplifiers can easily set their gain. To the output of the differential amplifier 203 is connected an emitter follower transistor 204 to reduce the output impedance, thereby enabling to drive the transistors 106a and 106b.

With the circuit of FIG. 5, the voltage of the drive signal is fed back to the bases of the transistors 106a and 106b to thereby perform self-excited oscillation. The transistor 106a at start up is rendered ON and oscillation can be started up without fail.

The d.c. voltage $V_{OUT}$ of the rectifying circuit 340 passing through the RC filter is voltage-divided by the resistors 207 and 208, and the difference between the reference voltage 102 and the voltage developed across the resistor 208 are amplified by the differential amplifier 203. The resultant amplified signal is applied to the transistors 106a and 106b as bias voltage. In the bias circuit 201, the voltage developed across the resistor 208 is applied to the inverting input terminal of the differential amplifier 203 and the reference voltage 102 is applied to the non-inverting input terminal of the differential amplifier 203. Therefore, the bias voltage decreases when voltage outputted from the secondary winding 104 increases, and the bias voltage increases when the voltage outputted form the secondary winding 104 decreases. Changing the bias voltage in this way changes the d.c. level of the feedback signal obtained from the feedback winding 104d and applied to the bases of the transistors 106a and 106b. Due to the change in the d.c. level of the feedback signal, the peak value of the base voltage (current) changes, and therefore, the level of the voltage induced at the secondary winding 104c is controlled.

In this manner, a feedback control system is formed wherein the target value is the reference voltage and the control amount is the rectified output from the secondary winding of the transformer. Control can be performed so that the rectified output becomes substantially a fixed value dependent on the reference voltage.

FIGS. 6 through 9 show examples of waveforms derived from actual measurements of the collector voltage of transistor 106a (upper level of the figures where the axis of ordinate represents 15 V/div) and the collector current of transistor 106a (lower level of the figures where the axis of ordinate represents 50 mA/div) when the reference voltage 102 of the circuit shown in FIG. 5 is changed. In the waveforms shown, the axis of abscissa represents 2 μs/div. In the measurements, oscillating frequency is 153 KHz and a load of 30 MΩ is connected to the output of the circuit shown in FIG. 5. The reference voltage is adjusted so that the d.c. output voltage $V_{OUT}$ becomes 1,500 V in the case of FIG. 6, the d.c. Output voltage $V_{OUT}$ becomes 1,200 V in the case of FIG. 7, the d.c. output voltage $V_{OUT}$ becomes 1,000 V in the case of FIG. 8, and the d.c. output voltage $V_{OUT}$ becomes 500 V in the case of FIG. 9. The bias voltage was reduced in order.

Figure 9:
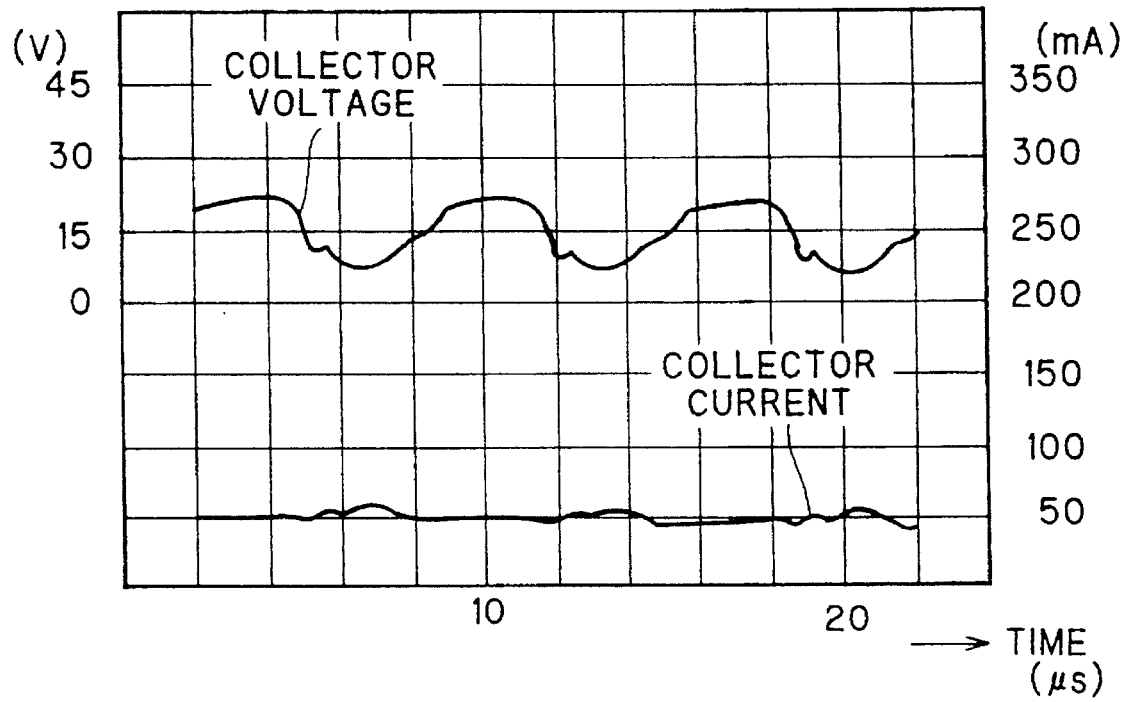
FIG. 9 is a diagram showing an example of actual waveforms of collector current (lower lever) and collector voltage (upper level) from a transistor 106a when reference voltage 102 is changed so that the d.c. output voltage $V_{OUT}$ is 500V, wherein the oscillating frequency is 153 KHz and a load of 30 MΩ is connected to the output of the circuit shown in FIG. 5.
Figure 10:
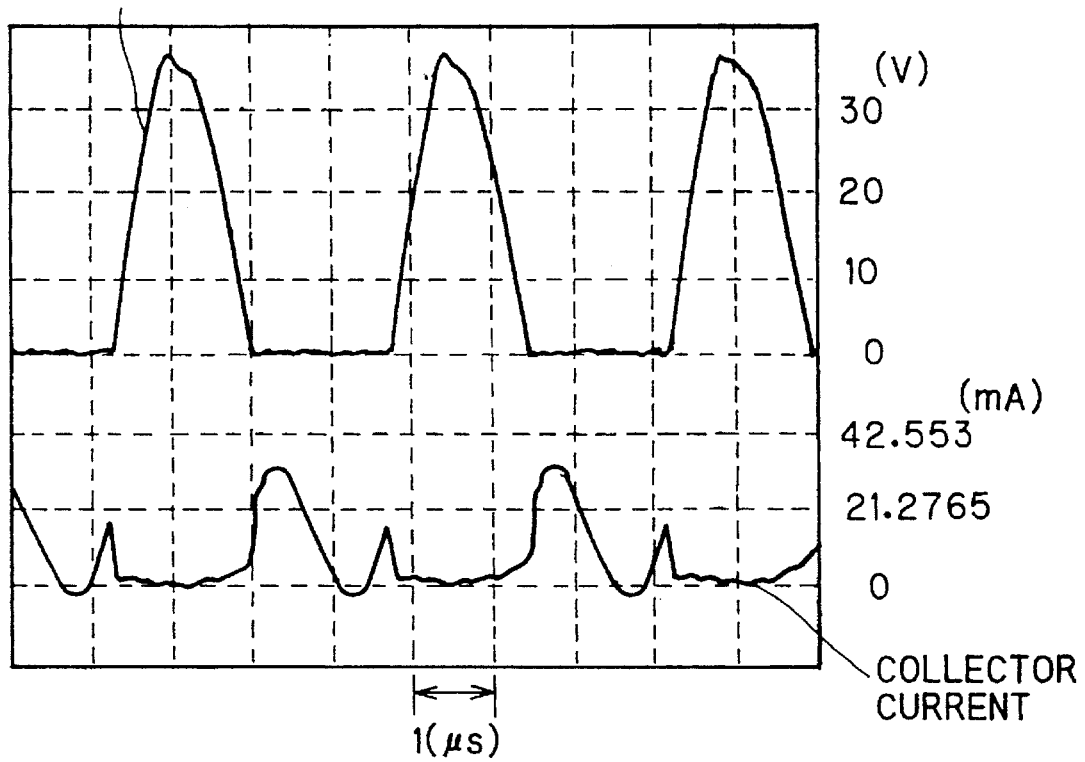
FIG. 10 is a diagram showing an example of actual waveforms of collector current (lower lever) and collector voltage (upper level) from a transistor 106a when reference voltage 102 is changed so that the d.c. output voltage $V_{OUT}$ is 1,500V, wherein the oscillating frequency is 285.7 KHz and a load of 30 MΩ is connected to the output of the circuit shown in FIG. 5.
Figure 11:
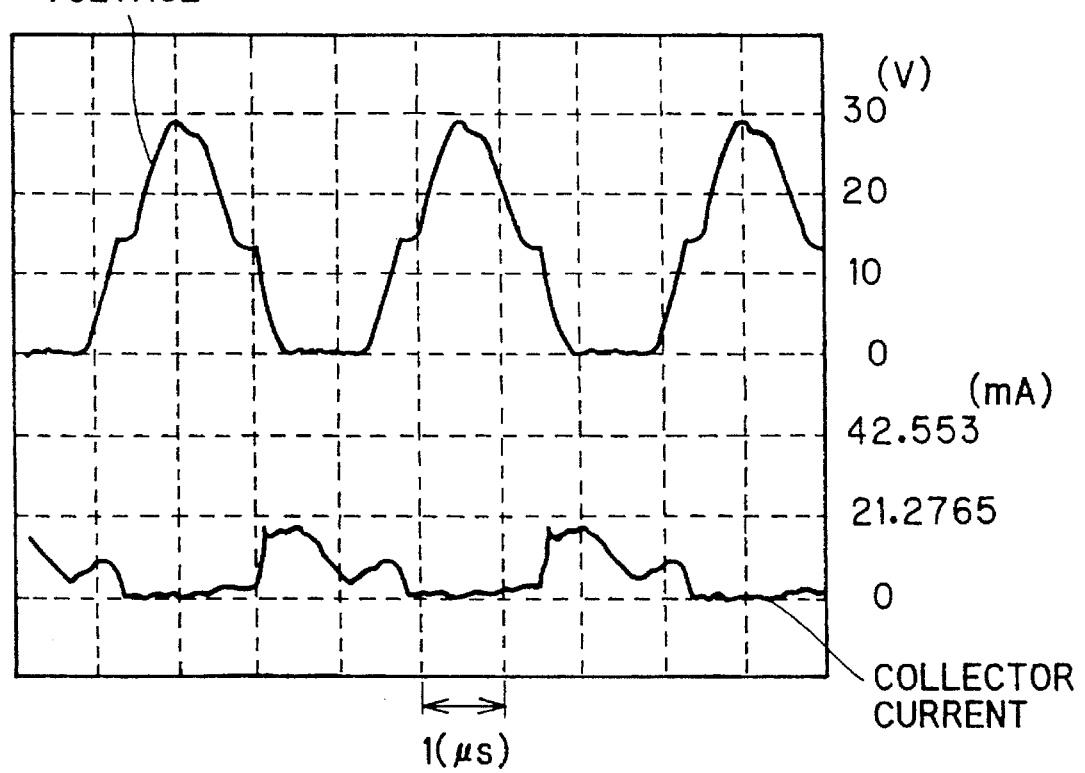
FIG. 11 is a diagram showing an example of actual waveforms of collector current (lower lever) and collector voltage (upper level) from a transistor 106a when reference voltage 102 is changed so that the d.c. output voltage $V_{OUT}$ is 1,200V, wherein the oscillating frequency is 285.7 KHz and a load of 30 MΩ is connected to the output of the circuit shown in FIG. 5.
Figure 12:
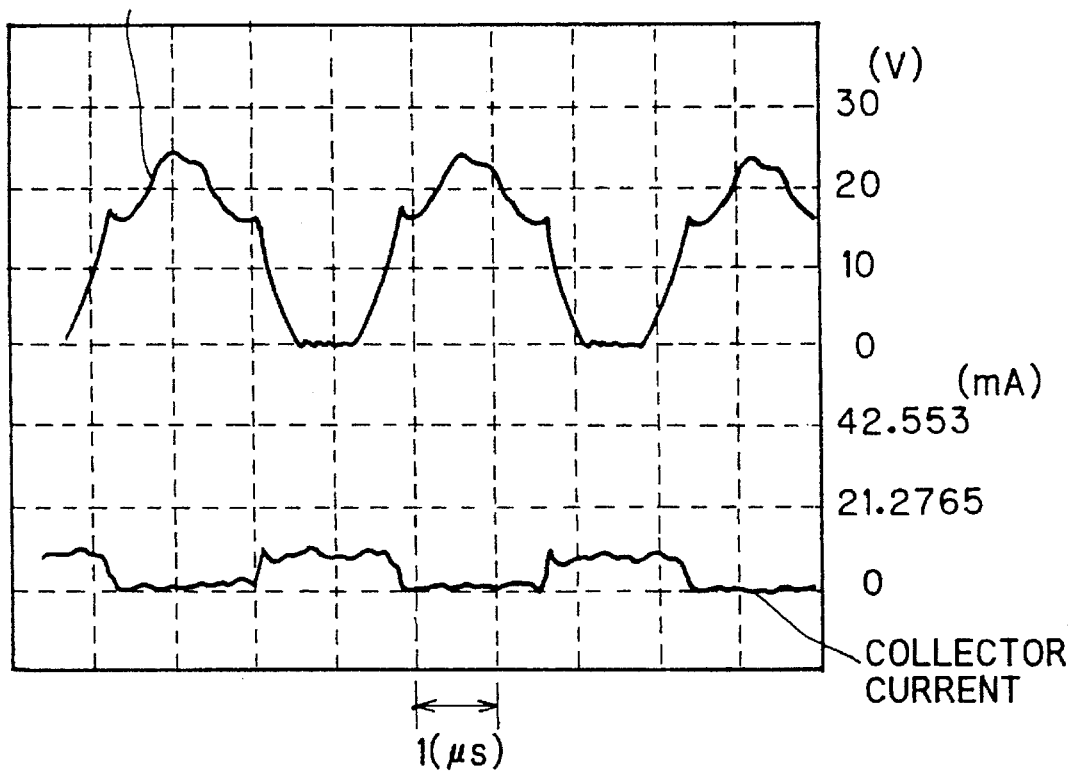
FIG. 12 is a diagram showing an example of actual waveforms of collector current (lower lever) and collector voltage (upper level) from a transistor 106a when reference voltage 102 is changed so that the d.c. output voltage $V_{OUT}$ is 1,000V, wherein the oscillating frequency is 285.7 KHz and a load of 30 MΩ is connected to the output of the circuit shown in FIG. 5.
Figure 13:
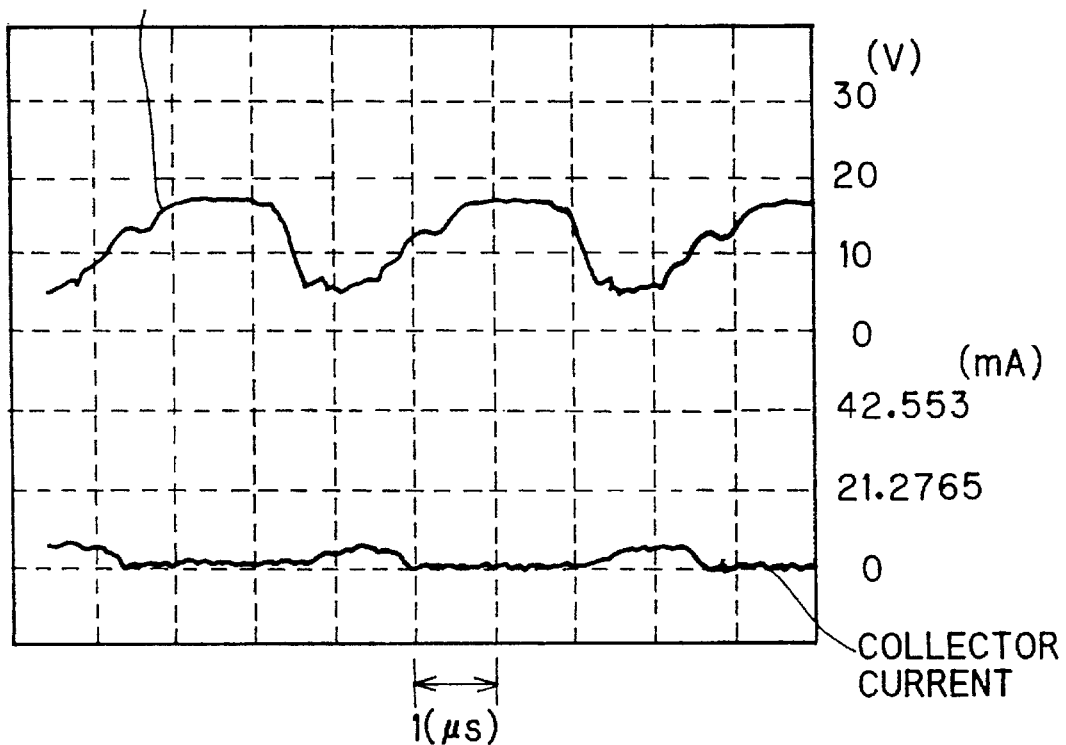
FIG. 13 is a diagram showing an example of actual waveforms of collector current (lower lever) and collector voltage (upper level) from a transistor 106a when reference voltage 102 is changed so that the d.c. output voltage $V_{OUT}$ is 500V, wherein the oscillating frequency is 285.7 KHz and a load of 30 MΩ is connected to the output of the circuit shown in FIG. 5.
Figure 14:
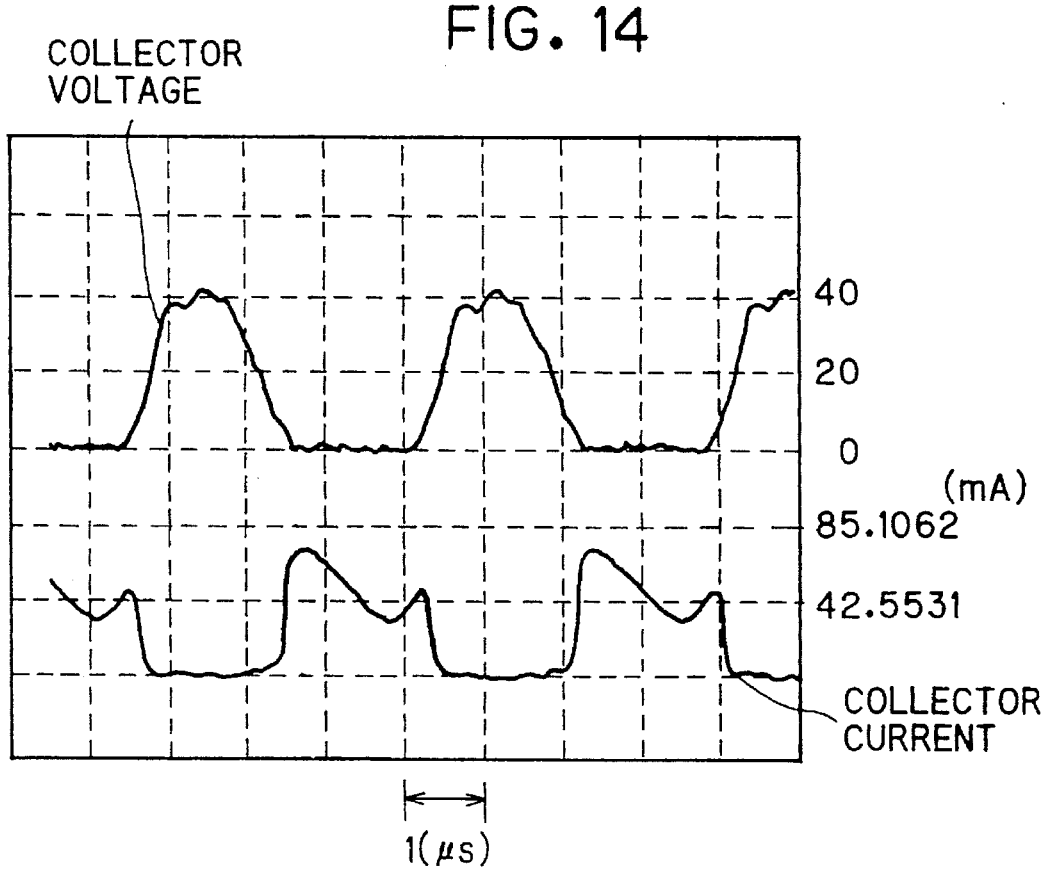
FIG. 14 is a diagram showing an example of actual waveforms of collector current (lower lever) and collector voltage (upper level) from a transistor 106a when reference voltage 102 is changed so that the d.c. output voltage $V_{OUT}$ is 1,500 V, wherein the oscillating frequency is 285.7 KHz and a load of 5 MΩ is connected to the output of the circuit shown in FIG. 5.
Figure 15:
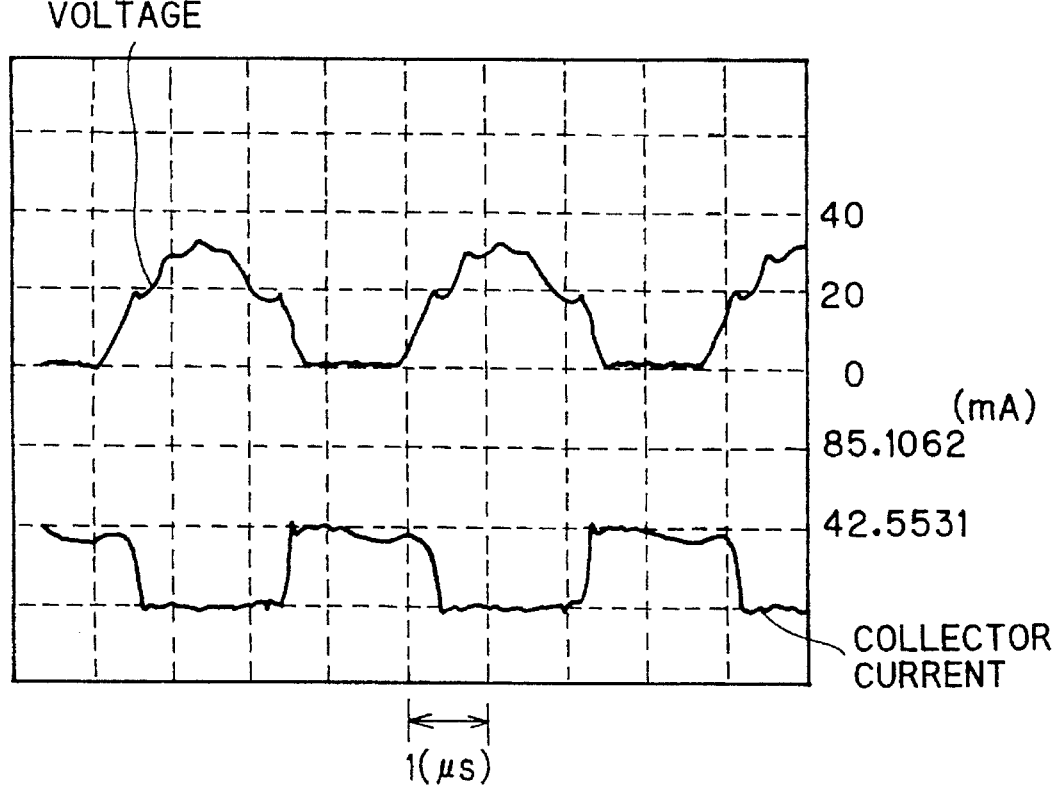
FIG. 15 is a diagram showing an example of actual waveforms of collector current (lower lever) and collector voltage (upper level) from a transistor 106a when reference voltage 102 is changed so that the d.c. output voltage $V_{OUT}$ is 1,200V, wherein the oscillating frequency is 285.7 KHz and a load of 5 MΩ is connected to the output of the circuit shown in FIG. 5.
Figure 16:
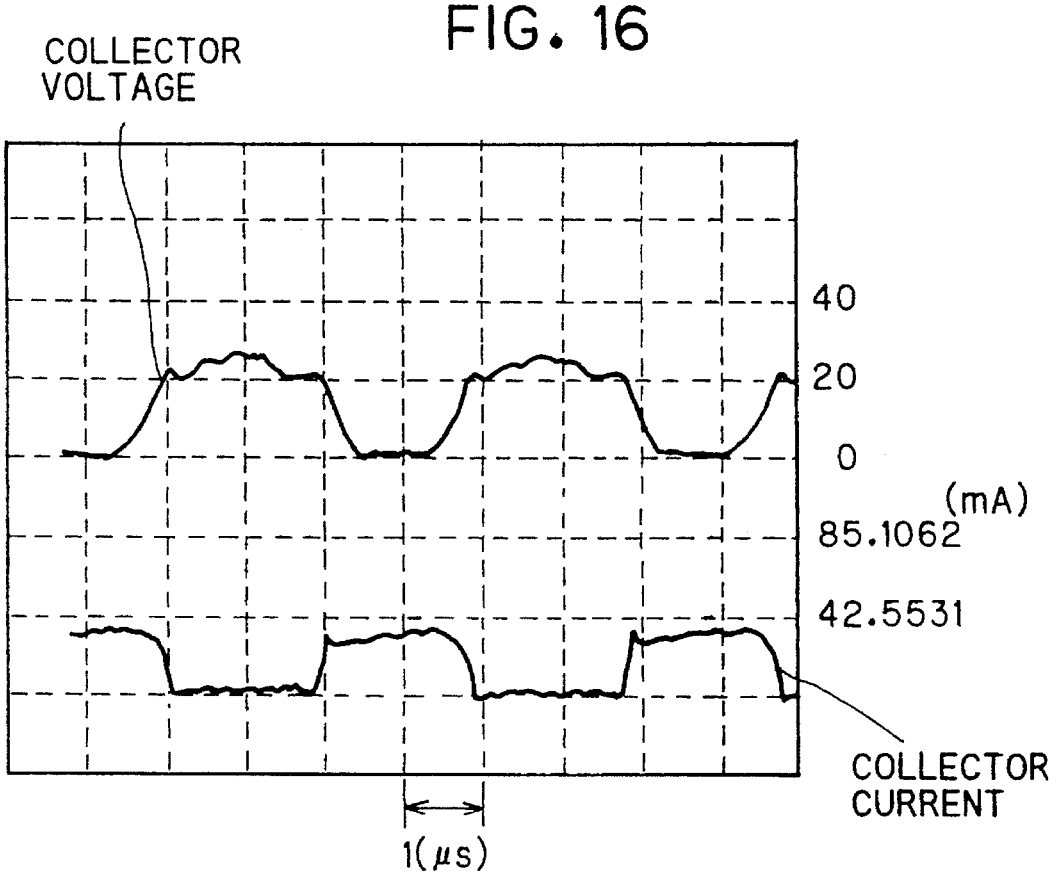
FIG. 16 is a diagram showing an example of actual waveforms of collector current (lower lever) and collector voltage (upper level) from a transistor 106a when reference voltage 102 is changed so that the d.c. Output voltage $V_{OUT}$ is 1,000V, wherein the oscillating frequency is 285.7 KHz and a load of 5 MΩ is connected to the output of the circuit shown in FIG. 5.
Figure 17:
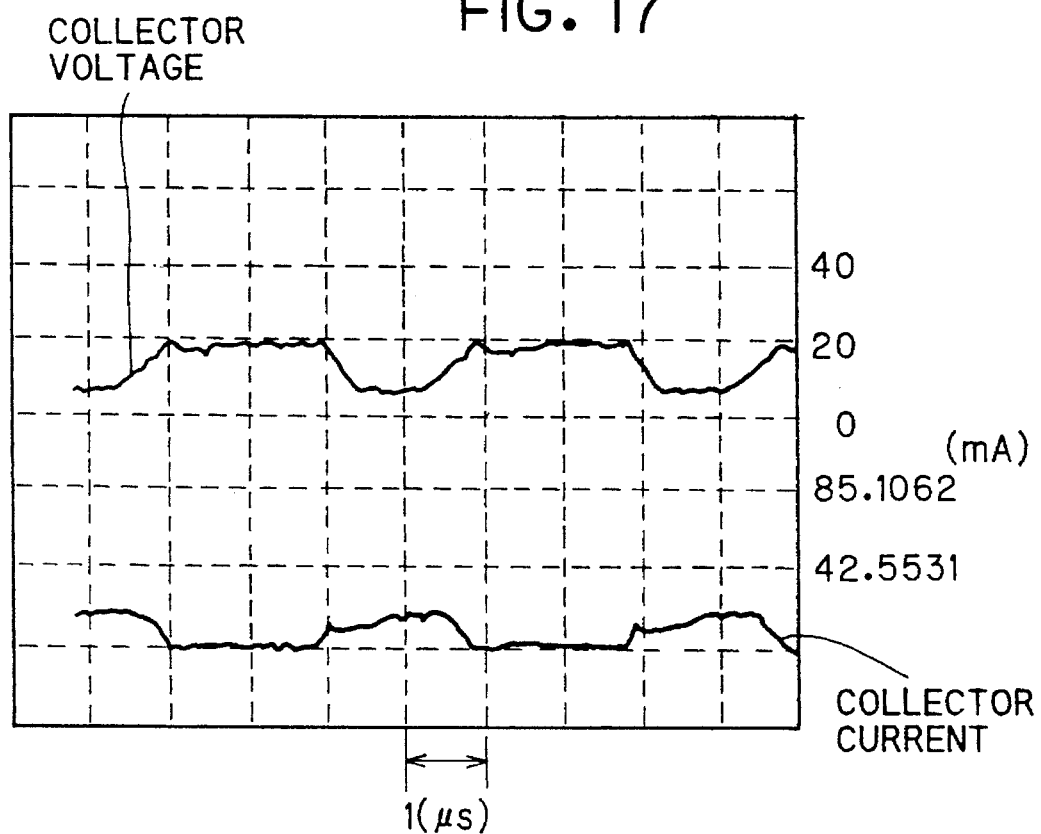
FIG. 17 is a diagram showing an example of actual waveforms of collector current (lower lever) and collector voltage (upper level) from a transistor 106a when reference voltage 102 is changed so that the d.c. output voltage $V_{OUT}$ is 500V, wherein the oscillating frequency is 285.7 KHz and a load of 5 MΩ is connected to the output of the circuit shown in FIG. 5.
Figure 18:
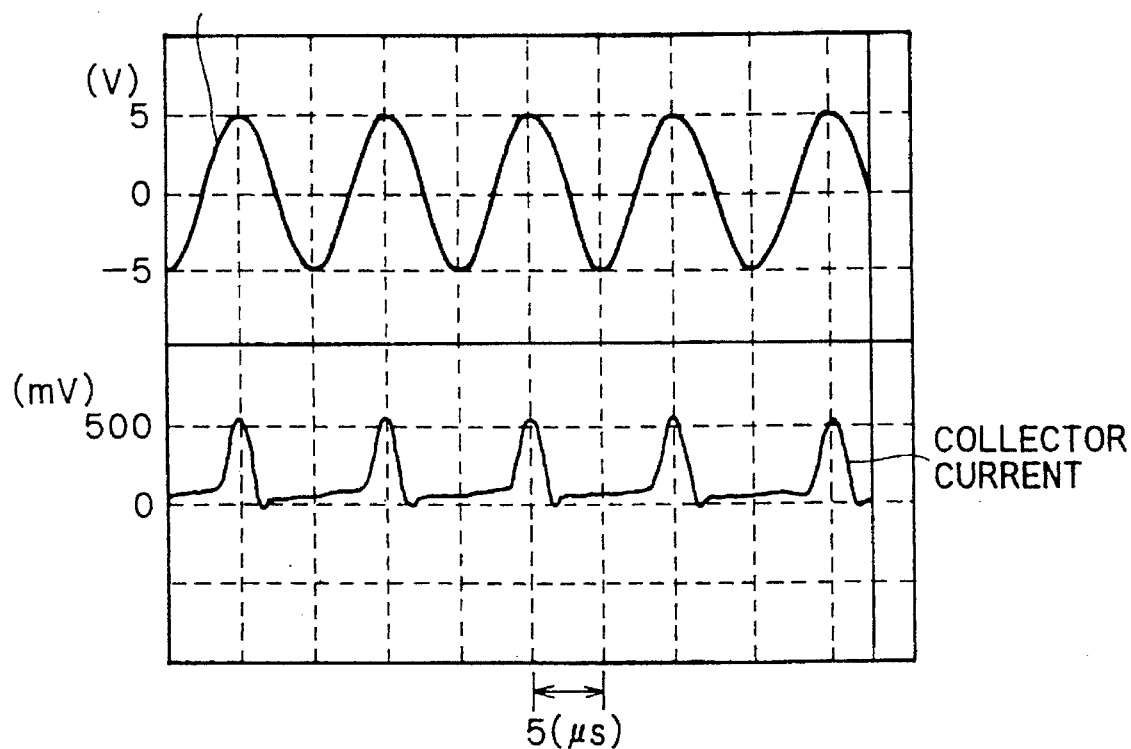
FIG. 18 is a frequency response curve of a Y10EA type diode when a 100 KHz signal is applied thereto.
Figure 19:
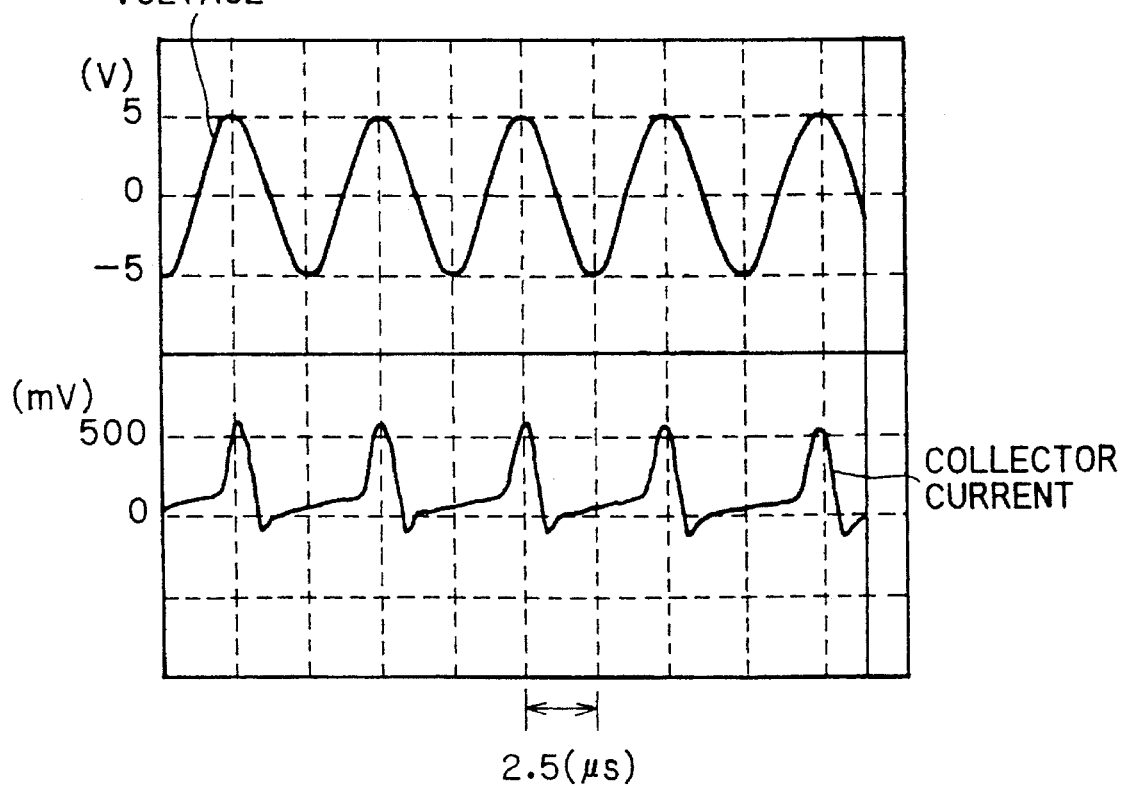
FIG. 19 is a frequency response curve of a Y10EA type diode when a 200 KHz signal is applied thereto.
Figure 20:
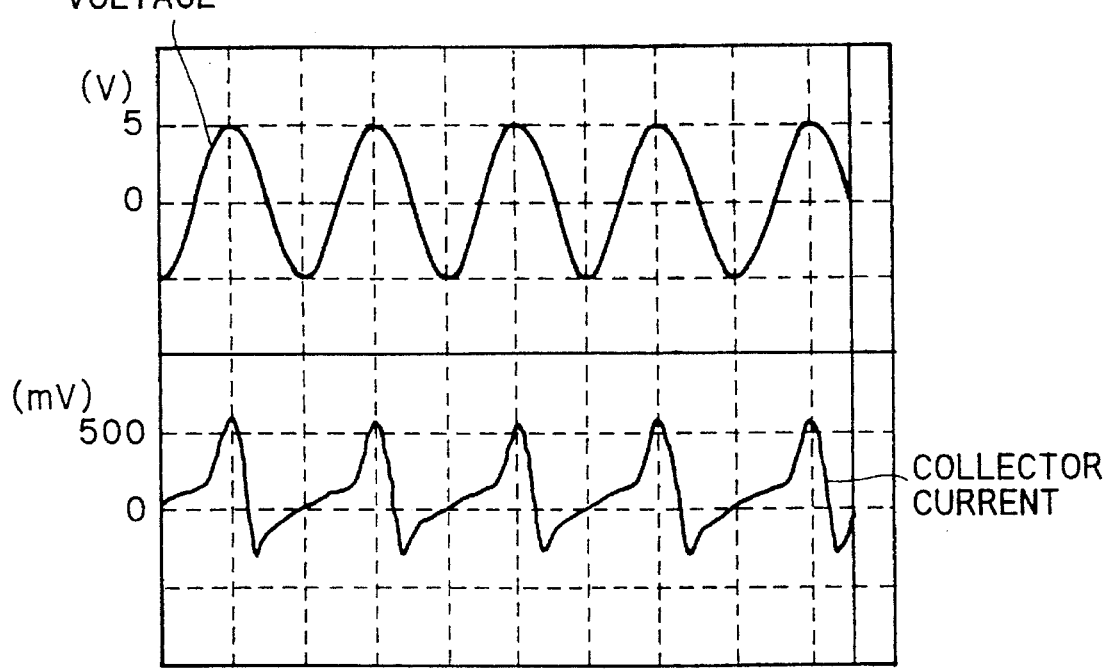
FIG. 20 is a frequency response curve of a Y10EA type diode when a 500 KHz signal is applied thereto.
Figure 21:
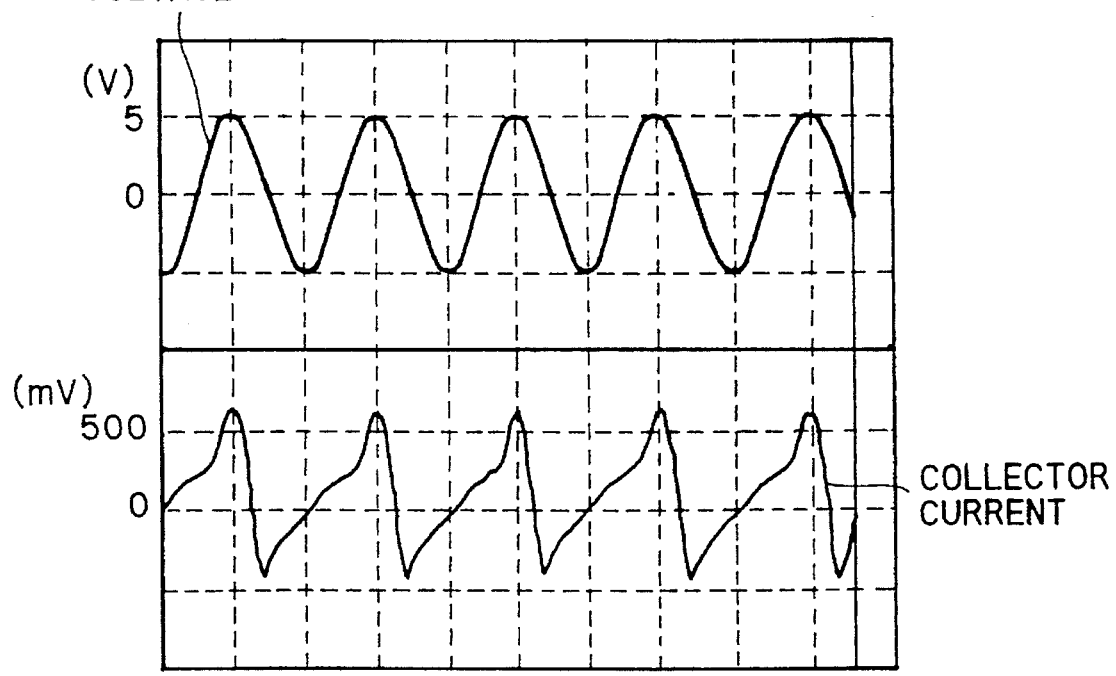
FIG. 21 is a frequency response curve of a Y10EA type diode when a 1 MHz signal is applied thereto.
Figure 22:
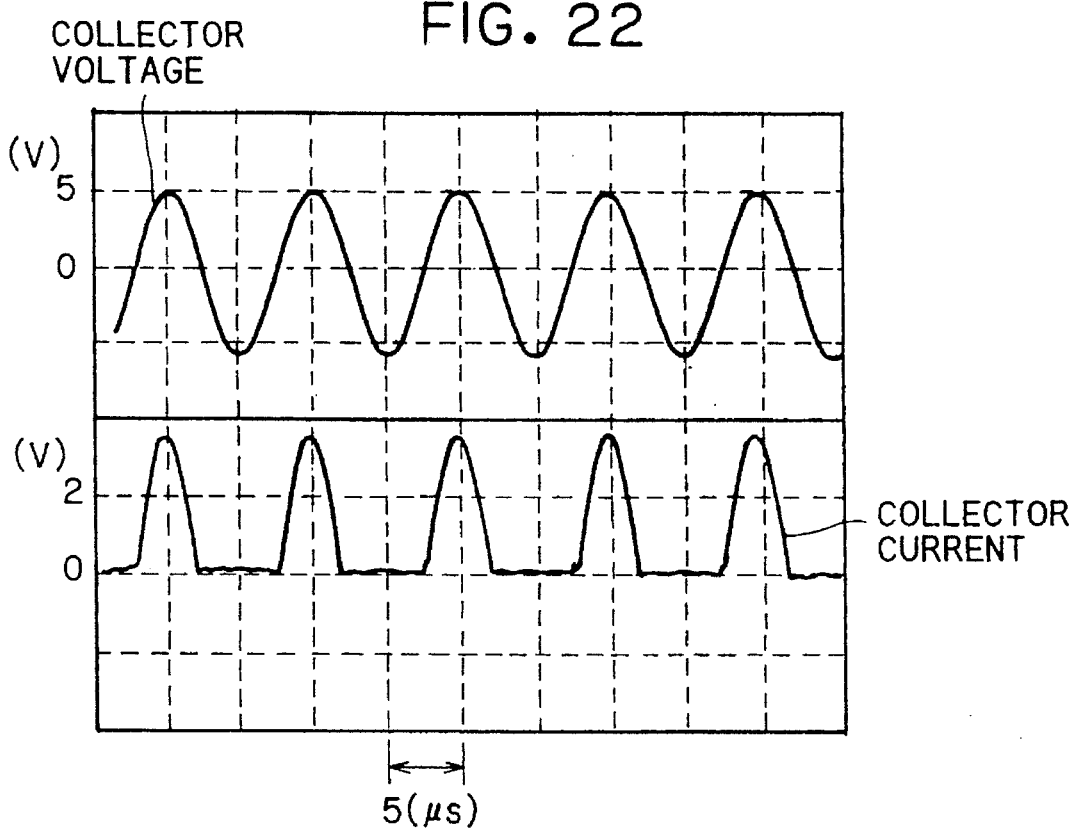
FIG. 22 is a frequency response curve of a 1SS306 type diode when a 100 KHz signal is applied thereto.
Figure 23:
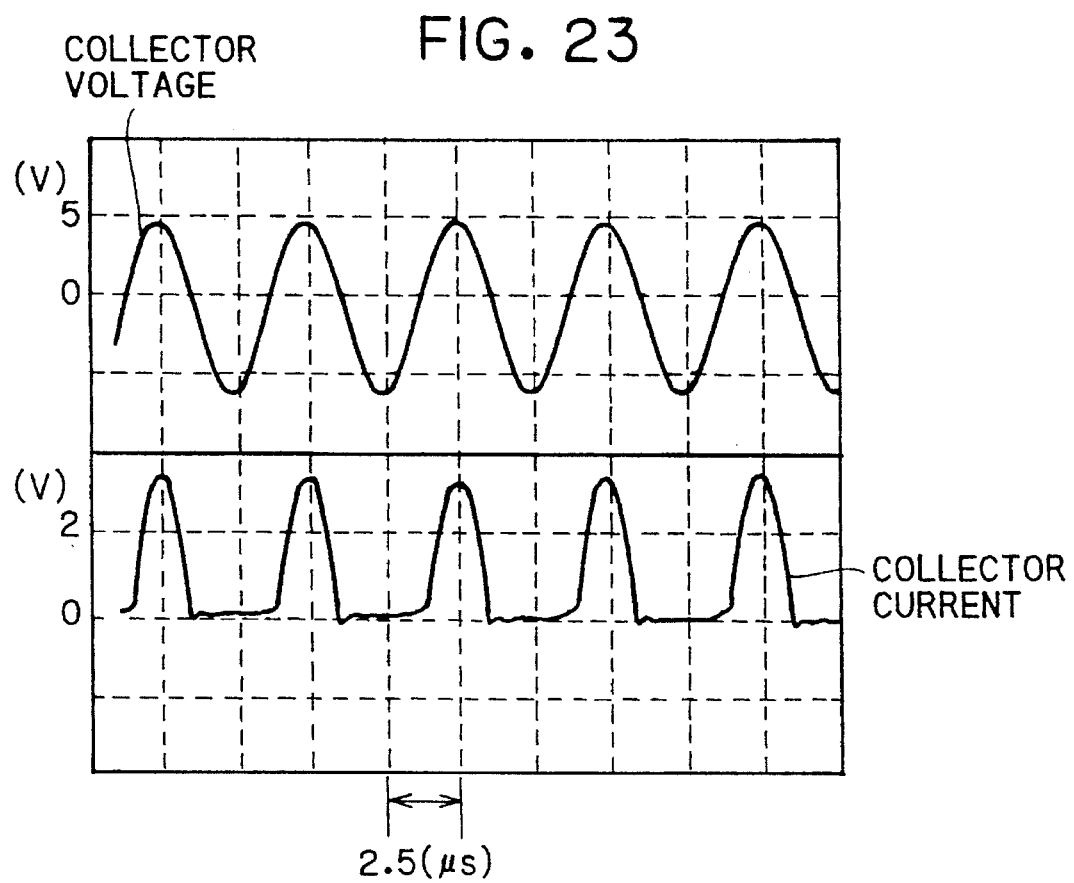
FIG. 23 is a frequency response curve of a 1SS306 type diode when a 200 KHz signal is applied thereto.
Figure 24:
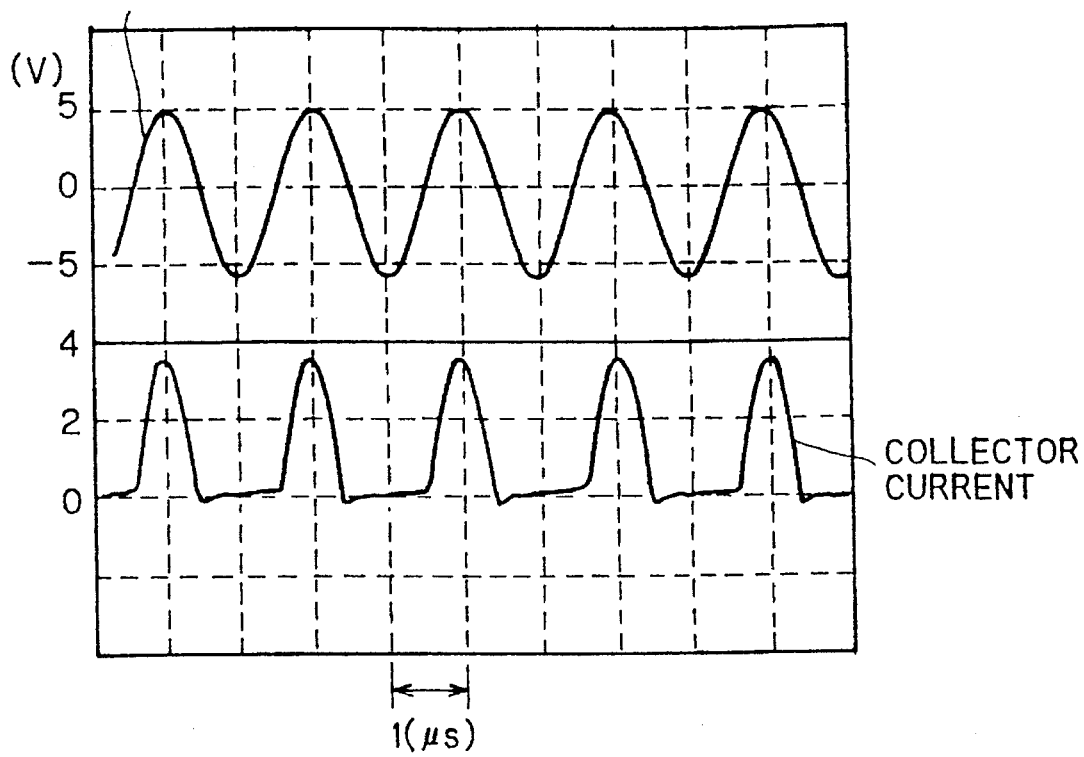
FIG. 24 is a frequency response curve of a 1SS306 type diode when a 500 KHz signal is applied thereto.
Figure 25:
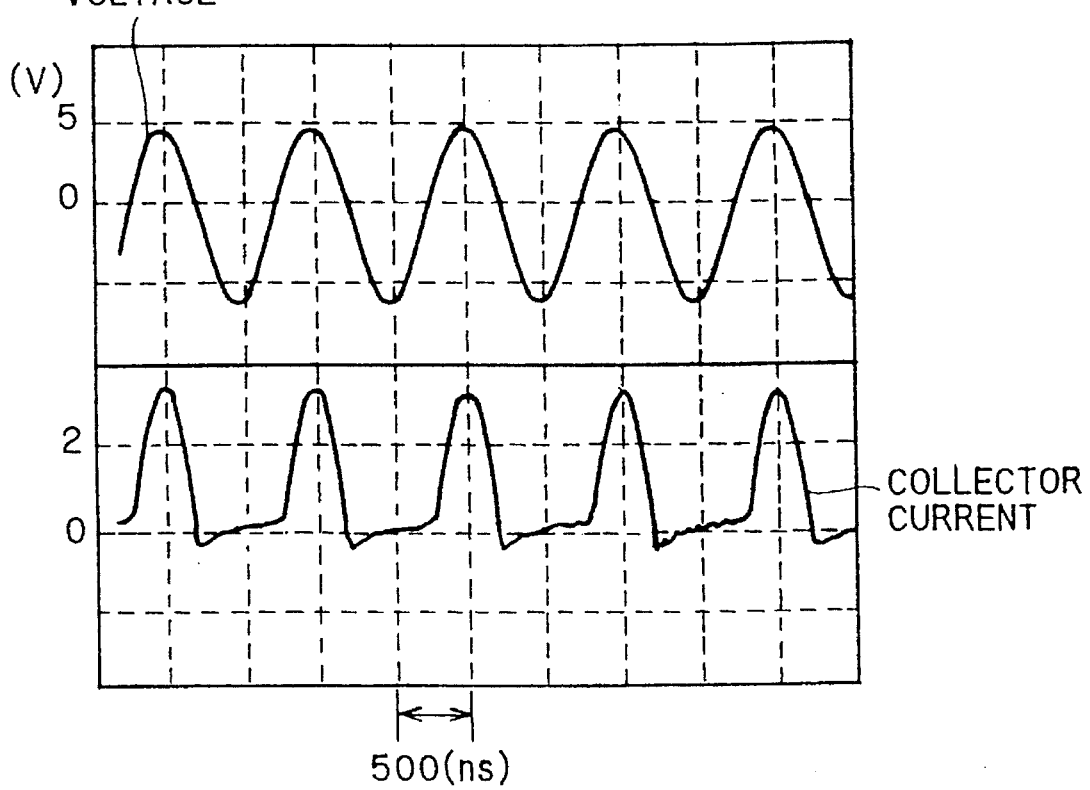
FIG. 25 is a frequency response curve of a 1SS306 type diode when a 1 MHz signal is applied thereto.

The characteristics of push-pull resonance type power supply circuits can be observed in the waveform figures shown in FIGS. 6 through 9. The transformer operates under an unsaturated condition. Due to the unsaturated energy derived from the transformer, a maximum voltage that is 2.828 times (derived from multiplying two times the square root of two) as large as the power supply voltage is developed across the switch element of the primary winding side. In FIGS. 6 through 9, as the collector current decreases, the maximum value of the collector voltage decreases. FIG. 9 shows a condition out of the resonance.

FIGS. 10 through 13 show examples of waveforms derived from actual measurements of the collector voltage of transistor 106a and the collector current of transistor 106a when the reference voltage 102 of the circuit shown in FIG. 5 is changed. In these measurements, oscillating frequency is 285.7 KHz and a load of 30 MΩ is connected to the output of the circuit shown in FIG. 5. The reference voltage is adjusted so that the d.c. output voltage $V_{OUT}$ becomes 1,500 V in the case of FIG. 10, the d.c. output voltage $V_{OUT}$ becomes 1,200 V in the case of FIG. 11, the d.c. output voltage $V_{OUT}$ becomes 1,000 V in the case of FIG. 12, and the d.c. output voltage $V_{OUT}$ becomes 500 V in the case of FIG. 13.

FIGS. 14 through 17 show still more examples of waveforms derived from actual measurements of the collector voltage of transistor 106a and the collector current of transistor 106a when the reference voltage 102 of the circuit shown in FIG. 5 is changed. In these measurements, oscillating frequency is 285.7 KHz and a load of 5 MΩ is connected to the output of the circuit shown in FIG. 5. The reference voltage is adjusted so that the d.c. output voltage $V_{OUT}$ becomes 1,500 V in the case of FIG. 14, the d.c. output voltage $V_{OUT}$ becomes 1,200 V in the case of FIG. 15, the d.c. output voltage $V_{OUT}$ becomes 1,000 V in the case of FIG. 16, and the d.c. output voltage $V_{OUT}$ becomes 500 V in the case of FIG. 17.

The waveforms of the collector currents in the above three types of examples are attained by observing with an oscilloscope a voltage developed across a resistor of 4.7 Ω connected between the emitter of one of the push-pull transistors and ground.

As is apparent from these results, it can be appreciated that reducing the bias voltage causes the peak value of the base current to reduce, and as a result the voltage induced at the secondary winding reduces. By using the difference between the reference voltage and the divided voltage of the rectified output from the secondary winding of the transformer, the rectified voltage can be substantially set to a fixed value dependent on the reference voltage. By increasing or decreasing the reference voltage, the unsaturated energy of the transformer changes. Accordingly, the rectified output can be adjusted over a wide range from the maximum value to the voltage value where the resonance does not taken place. Also, when normal operation is performed as shown in FIGS. 6 through 17, the switching locus (refer to reference 2 page 144) is drawn to pass the vicinity of the axes of ordinate and abscissa. There is therefore very little loss with this device.

FIGS. 18 through 21 show frequency response curves of a diode of Y10EA type (available on the market by identifying this number) which is used in the place of D11 and D12 in the Cockcroft circuit 340 shown in FIG. 5. FIGS. 22 through 25 show frequency response curves of a diode of 1SS306 type (available on the market by identifying this number) which is used in the place of D11 and D12 in the Cockcroft circuit 340 shown in FIG. 5. The frequency of the signal applied to the latter type diode can be increased in comparison with that applied to the former type diode. With the use of 1SS306 type diode, efficiency of the circuit can be enhanced and the input current can be reduced to an extent of 44 to 52% with respect to the input current needed for the conventional dropper type power supply circuit. In the case of using Y10EA type diode, the circuit is operable for the oscillating frequency in a range of less than 200 KHz, and in the case of using 1SS306 type diode, the circuit is operable for the oscillating frequency in a range of less than 1 MHz.

Figure 1:
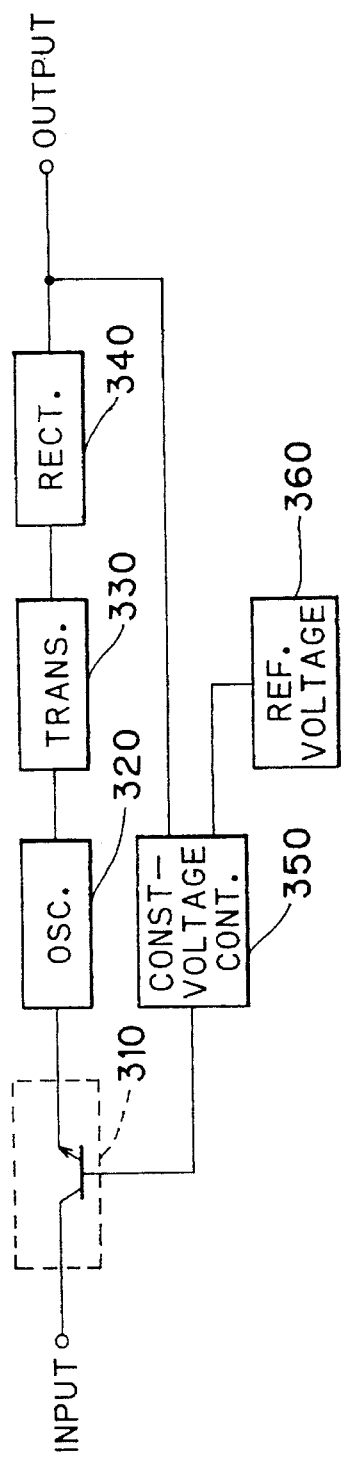
FIG. 1 is a diagram showing an example of a conventional dropper type regulated power supply circuit.
Figure 2:
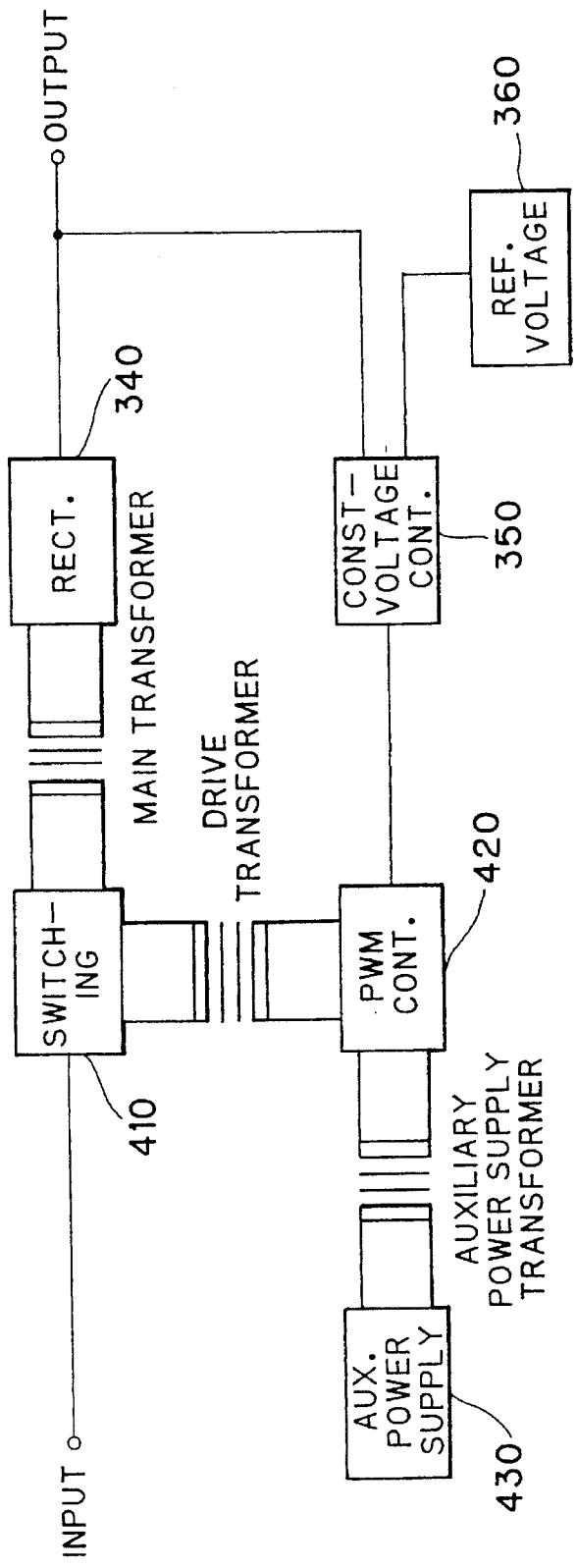
FIG. 2 is a diagram showing an arrangement of another conventional switching power supply circuit according to a PWM control.
Figure 3:
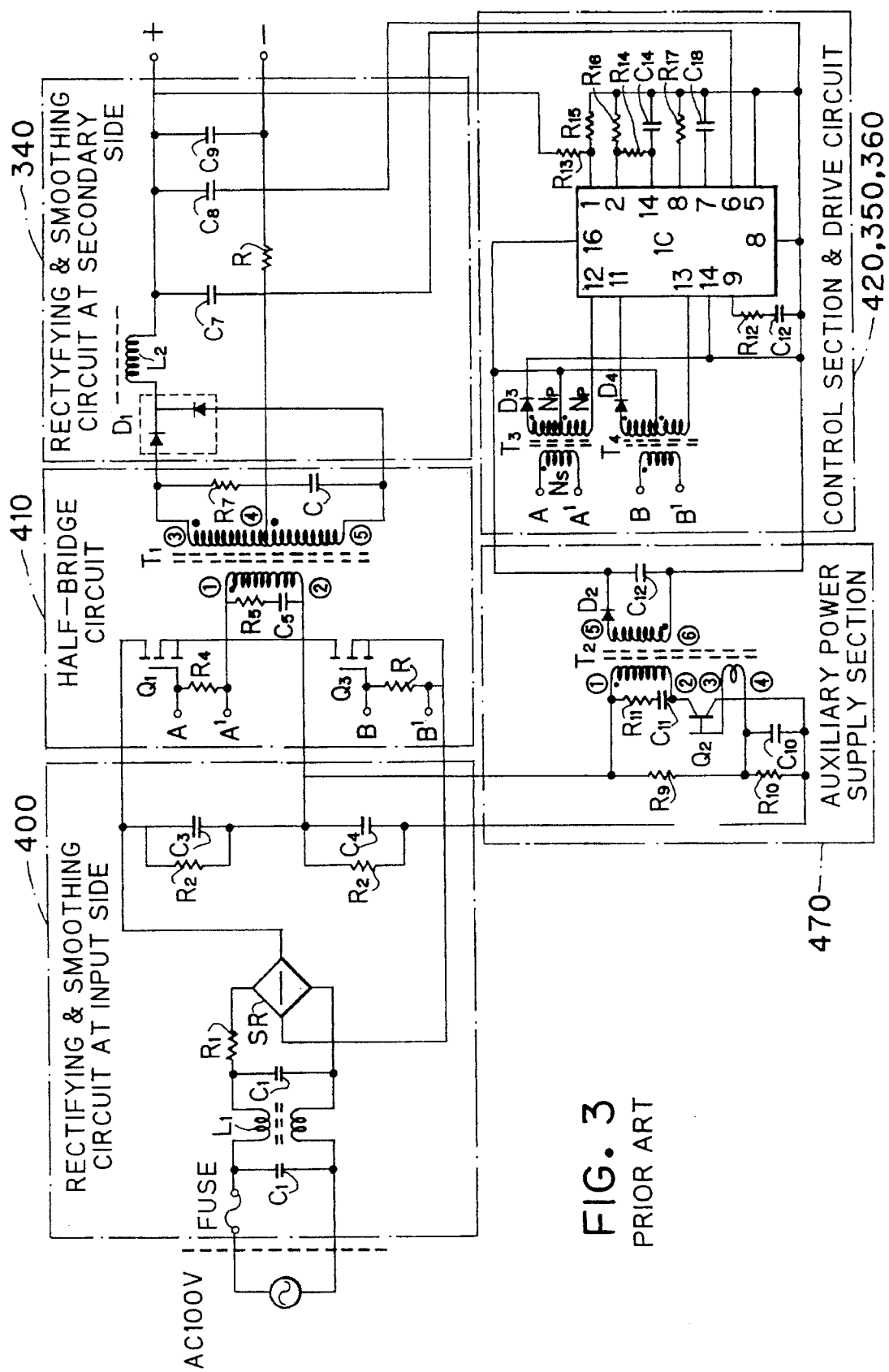
FIG. 3 is a diagram showing a specific example of the structure of a switching power supply circuit according to a PWM control.

A resonant power supply circuit according to the present invention has features of low loss from switching elements, a simple structure, compact size, and low cost in addition to the feature of little higher harmonic noise. Also, because oscillation is performed in an unsaturated region, the disadvantages as are present in reference 4 do not occur. Comparing the circuit of the present invention with the regulated power supply circuit of the dropper type shown in FIG. 1 under the same condition, volume is decreased to one fifth and consumption of current is decreased to 44%. The circuit shown in FIG. 5 is simple in the circuit structure because the use of capacitors are limited to resonance, rectification, and smoothing and is easily produced into an IC chip from the following reasons.

In order for self-exited oscillation to take place, the loop gain of the oscillator must be one or more. In order to control the oscillation output, it is desirable that the change of the oscillation output be large in regards to the minute changes of the rectification output. In a resonant power supply circuit according to the present invention, because a differential amplifier is used in the bias circuit, a sufficiently large change can be obtained in the bias voltage in regards to the minute changes in the rectified output. In addition, the gain and the constant of the differential amplifier can be simply set by using well-known designing methods. Accordingly, it is possible to design a circuit so that the rectified output is adjustable over a wide range while maintaining the self-excited oscillation conditions.

A diode may be connected to the base or emitter of the transistors 106a and 106b to prevent these transistors from being damaged when bias voltages applied to the bases of the transistors 106a and 106b exceed rated voltages to these transistors.

A field-effect transistor can be used for the transistors 106a and 106b. However, because the gain gm of the field-effect transistor is smaller than that of the bipolar transistors, there is a need to carefully set the constant. Therefore, the adjustable range of the rectified output becomes small.

Although a resonance capacitor is connected across both terminals of the primary winding, it can be connected to the secondary side or a winding for used in the resonance circuit may be provided to increase the sharpness Q in the resonance.

According to the present invention, the feedback signal obtained from the feedback winding and applied to the base of the transistor controls the level of the voltage induced in the secondary winding side by changing the bias voltage. Therefore, bias voltage dependent output can be obtained from the secondary winding and thus desired rectified output can be obtained.

By applying the bias voltage, which is obtained by amplifying a difference between the reference voltage and the rectified output from the secondary winding, to the base of the transistor, a feedback control system is formed wherein the control amount is the rectified output of the secondary winding of the transformer, and the target value is the reference voltage. Thererore, a power supply with a simple structure can be provided wherein a voltage substantially dependent on the reference voltage is obtained regardless of the presence of load fluctuation.

By the use of a single winding for the feedback winding of the transformer, the structure can be further simplified and start-up can be more definite.

While exemplary embodiments of this invention have been described in detail, those skilled in the art will recognize that there are many possible modifications and variations which may be made in these exemplary embodiments while yet retaining many of the novel features and advantages of the invention.

What is claimed is:

1. A switching power supply circuit comprising:

a transformer including a primary winding having an inductance, a feedback winding, and a secondary winding, said primary winding and said feedback winding being located at a primary side of said transformer, said secondary winding being located at a secondary side of said transformer, and said feedback winding having a first terminal and a second terminal;

a capacitor having a capacitance and connected in parallel to said primary winding to form a resonance circuit in combination with said primary winding, said resonance circuit resonating at a frequency determined by the capacitance of said capacitor and the inductance of said primary winding;

a rectifying circuit, connected to said secondary winding, rectifying a voltage developed across said secondary winding and producing a rectified voltage;

a transistor pair connected across said primary winding in push-pull configuration, said transistor pair including a first transistor having a control electrode connected to the first terminal of said feedback winding, and a second transistor having a control electrode connected to the second terminal of said feedback winding; and a bias circuit connected to the control electrodes of said first and second transistors and applying a bias voltage thereto, said bias circuit including means for varying the bias voltage;

wherein said bias voltage varying means comprises means for generating a reference voltage, and comparison means for comparing the rectified voltage produced from said rectifying circuit with the reference voltage and for outputting a comparison result, the bias voltage being varied based on the comparison result.

2. A switching power supply circuit according to claim 1, wherein said reference voltage generating means comprises means for varying the reference voltage.

3. A switching power supply circuit according to claim 2, wherein said feedback winding comprises a single winding.

4. A switching power supply circuit comprising:

a transformer including a primary winding having an inductance, a feedback winding, and a secondary winding, said primary winding and said feedback winding being located at a primary side of said transformer, said secondary winding being located at a secondary side of said transformer, and said feedback winding having a first terminal and a second terminal;

a capacitor having a capacitance and connected in parallel to said primary winding to form a resonance circuit in combination with said primary winding, said resonance circuit resonating at a frequency determined by the capacitance of said capacitor and the inductance of said primary winding;

a rectifying circuit, connected to said secondary winding, rectifying a voltage developed across said secondary winding and producing a rectified voltage;

a transistor pair connected across said primary winding in push-pull configuration, said transistor pair including a first transistor having a control electrode connected to the first terminal of said feedback winding, and a second transistor having a control electrode connected to the second terminal of said feedback winding;

a bias circuit connected to the control electrodes of said first and second transistors and applying a bias voltage thereto, said bias circuit including means for varying the bias voltage;

an RC filter composed of a resistor and a capacitor, said RC filter being connected to said rectifying circuit to remove ripple components contained in the rectified output and output a d.c. voltage; and voltage division means, connected to the output of said RC filter, for producing a divided voltage of the d.c. voltage;

wherein said bias voltage varying means comprises means for generating a reference voltage, and comparison means for comparing the divided voltage of the d.c. voltage with the reference voltage and for outputting a comparison result.

5. A switching power supply circuit according to claim 4, wherein said reference voltage generating means comprises means for varying the reference voltage.

6. A switching power supply circuit according to claim 5, wherein said feedback winding comprises a single winding.

7. A switching power supply circuit according to claim 6, further comprising a resistor interposed between the control electrode of said first transistor and said bias circuit, and wherein the bias voltage is applied to the control electrode of said second transistor through said feedback winding.

8. A switching power supply circuit according to claim 7, further comprising a power supply supplying a voltage, and wherein said primary winding has a center tap separating said primary winding into two segments, said power supply being connected to the center tap of said primary winding to apply the voltage thereto.

9. A switching power supply circuit according to claim 8, further comprising a winding connected between said power supply and said center tap of said primary winding, wherein an inductance of said winding is greater than an inductance of said primary winding.

10. A switching power supply circuit comprising:

a transformer including a primary winding having an inductance, a feedback winding, and a secondary winding, said primary winding and said feedback winding being located at a primary side of said transformer, said secondary winding being located at a secondary side of said transformer, and said feedback winding having a first terminal and a second terminal;

a capacitor having a capacitance and connected in parallel to said primary winding to form a resonance circuit in combination with said primary winding, said resonance circuit resonating at a frequency determined by the capacitance of said capacitor and the inductance of said primary winding;

a rectifying circuit, connected to said secondary winding, rectifying a voltage developed across said secondary winding and producing a rectified voltage;

a transistor pair connected across said primary winding in push-pull configuration, said transistor pair including a first transistor having a control electrode connected to the first terminal of said feedback winding, and a second transistor having a control electrode connected to the second terminal of said feedback winding;

a bias circuit connected to the control electrodes of said first and second transistors and applying a bias voltage thereto, said bias circuit including means for varying the bias voltage; and voltage division means, connected to said rectifying circuit, for producing a divided voltage of the rectified voltage, and wherein said bias voltage varying means comprises means for generating a reference voltage and a differential amplifier having a non-inverting input terminal applied with the reference voltage and an inverting input terminal applied with the divided voltage of the rectified voltage, said differential amplifier producing an amplified differential output of the reference voltage and the divided voltage of the rectified voltage.

11. A switching power supply circuit according to claim 10, wherein said reference voltage generating means comprises means for varying the reference voltage.

12. A switching power supply circuit according to claim 11, wherein said feedback winding comprises a single winding.

13. A switching power supply circuit according to claim 12, further comprising an RC filter composed of a resistor and a capacitor, said RC filter being connected to said rectifying circuit to remove ripple components contained in the rectified out, and wherein said voltage division means is connected to said RC filter.

14. A switching power supply circuit according to claim 13, further comprising a resistor interposed between the control electrode of said first transistor and said bias circuit, and wherein the bias voltage is applied to the control electrode of said second transistor through said feedback winding.

15. A switching power supply circuit according to claim 14, further comprising a power supply supplying a voltage, and wherein said primary winding has a center tap separating said primary winding into two segments, said power supply being connected to the center tap of said primary winding to apply a voltage thereto.

16. A switching power supply circuit according to claim 15, further comprising a winding connected between said power supply and said center tap of said primary winding, wherein an inductance of said winding is greater than an inductance of said primary winding.

* * * * *